(12) United States Patent
Surdu

(10) Patent No.: US 10,948,967 B2
(45) Date of Patent: *Mar. 16, 2021

(54) MOBILE DEVICE VIRTUALIZATION SOLUTION BASED ON BARE-METAL HYPERVISOR WITH OPTIMAL RESOURCE USAGE AND POWER CONSUMPTION

(71) Applicant: Oleksii Surdu, Broadlands, VA (US)

(72) Inventor: Oleksii Surdu, Broadlands, VA (US)

(73) Assignee: InZero Technologies, LLC, Sterling, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/705,933

(22) Filed: Dec. 6, 2019

(65) Prior Publication Data

US 2020/0110459 A1 Apr. 9, 2020

Related U.S. Application Data

(63) Continuation of application No. 15/430,651, filed on Feb. 13, 2017, now Pat. No. 10,503,237.

(51) Int. Cl.
| | |
|---|---|
| *G06F 9/455* | (2018.01) |
| *G06F 1/3234* | (2019.01) |
| *G06F 9/46* | (2006.01) |
| *G06F 9/50* | (2006.01) |

(52) U.S. Cl.
CPC ........ *G06F 1/3234* (2013.01); *G06F 9/45541* (2013.01); *G06F 9/45558* (2013.01); *G06F 9/462* (2013.01); *G06F 9/5077* (2013.01); *G06F 2009/45566* (2013.01); *Y02D 10/00* (2018.01)

(58) Field of Classification Search
None
See application file for complete search history.

(56) References Cited

U.S. PATENT DOCUMENTS

| | | |
|---|---|---|
| 8,387,046 B1 | 2/2013 | Montague et al. |
| 8,560,826 B2 | 10/2013 | Wu et al. |
| 8,683,548 B1 * | 3/2014 | Curry ............ G06F 21/57 726/1 |
| 8,719,560 B2 | 5/2014 | Bealkowski et al. |
| 8,756,417 B1 | 6/2014 | Gardner |
| 8,972,984 B2 | 3/2015 | Meisner et al. |
| 9,176,752 B1 | 11/2015 | Marr et al. |
| 9,286,097 B2 | 3/2016 | Rothman et al. |

(Continued)

*Primary Examiner* — Hiren P Patel
(74) *Attorney, Agent, or Firm* — Capitol City Techlaw; Jasbir Singh

(57) ABSTRACT

The invention provides multiple secure virtualized environments operating in parallel with optimal resource usage, power consumption and performance. The invention provides a method whereby virtual machines (VMs) have direct access to the computing system's hardware without adding traditional virtualization layers while the hypervisor maintains hardware-enforced isolation between VMs, preventing risks of cross-contamination. Additionally, some of the VMs can be deactivated and reactivated dynamically when needed, which saves the computing system resources. As a result, the invention provides bare-metal hypervisor use and security but without the limitations that make such hypervisors impractical, inefficient and inconvenient for use in mobile devices due to the device's limited CPU and battery power capacity.

16 Claims, 10 Drawing Sheets

(56) References Cited

U.S. PATENT DOCUMENTS

| | | | |
|---|---|---|---|
| 9,305,147 B1 | 4/2016 | Azmat et al. | |
| 9,448,825 B2 | 9/2016 | Newell et al. | |
| 9,607,351 B2 | 3/2017 | Khosa et al. | |
| 9,626,205 B2 | 4/2017 | Yu | |
| 10,121,001 B1 | 11/2018 | Zeng et al. | |
| 10,503,237 B2 * | 12/2019 | Surdu | G06F 1/3234 |
| 2009/0204964 A1 | 8/2009 | Foley et al. | |
| 2011/0004680 A1 | 1/2011 | Ryman | |
| 2011/0141124 A1 | 6/2011 | Halls et al. | |
| 2012/0054744 A1 | 3/2012 | Singh et al. | |
| 2012/0084793 A1 | 4/2012 | Reeves et al. | |
| 2012/0297383 A1 * | 11/2012 | Meisner | G06F 3/165 718/1 |
| 2013/0191648 A1 | 7/2013 | Bursell | |
| 2013/0339957 A1 | 12/2013 | Azam et al. | |
| 2015/0029200 A1 | 1/2015 | Khosa et al. | |
| 2015/0032910 A1 * | 1/2015 | Ben Yehuda | G06F 13/4221 710/15 |
| 2015/0052519 A1 * | 2/2015 | Yu | G06F 21/53 718/1 |
| 2015/0193251 A1 | 7/2015 | Chu et al. | |
| 2015/0220354 A1 | 8/2015 | Nair | |
| 2016/0241702 A1 | 8/2016 | Chandra et al. | |
| 2017/0366606 A1 | 12/2017 | Ben-Shaul et al. | |
| 2018/0032249 A1 | 2/2018 | Makhervaks et al. | |
| 2018/0225140 A1 | 8/2018 | Titus et al. | |

* cited by examiner

MOBILE DEVICE VIRTUALIZATION SOLUTION BASED ON BARE-METAL HYPERVISOR WITH OPTIMAL RESOURCE USAGE AND POWER CONSUMPTION

CROSS REFERENCE TO OTHER APPLICATIONS

The present application claims priority from U.S. patent application Ser. No. 15/430,651, filed Feb. 13, 2017.

BACKGROUND OF THE INVENTION

In the past two decades, computing services have increasingly migrated to data centers in cloud networks. In more recent years, there has been a proliferation of mobile device use—smartphones, tablets, hybrids such as notebooks, phablets and Chromebooks—that also heavily rely on cloud services for operating and data storage. Mobile devices have been accepted for business use by every industry in one way or another. This has created security risks and challenges for protecting organization data and business processes while allowing broadest possible device use for both business purposes and user personal convenience. Typically, mobile devices have unrestricted internet access and very rare security updates, making them relatively easy targets for hacking. Current mobile security solutions rely on operating systems security features and have been proven ineffective. One underlying primary reason for this is the size and complexity of the device's kernel and operating system itself. Despite continual industry efforts to improve security, the large code size, constant addition of new features, and monolithic architecture of popular kernels, create a never-ending patching process with usually an unknown number of vulnerabilities left in the system. That is why lightweight hardware-enforced hypervisor solutions (called "type-1" or "bare-metal") can provide necessary security enhancement and create isolated security environments with strict security policies protecting these systems from many vectors of attacks and preventing exploitation of existing vulnerabilities.

Unfortunately, bare-metal hypervisors for mobile devices proved much more difficult to implement practically than such hypervisors for personal computers and servers. The main reasons for this are limited CPU resources and limited power capacity of mobile devices. In particular, full device virtualization or paravirtualization creates an additional software layer between the operating system and device hardware that consumes available resources and drains power. Moreover, a mobile device's performance heavily relies on hardware acceleration, especially in multimedia functions, where without direct hardware access, many system functions become unavailable to user. The present invention solves these problems, using an innovative method whereby VMs can have direct access to the computing system's hardware without adding a traditional virtualization layer while at the same time, the hypervisor maintains hardware-enforced isolation between VMs, preventing risks of cross-contamination between VMs.

RELATED ART

The following references identify related art:
[1] Surdu, "Secure Single-VM-Executing Hypervisor with Minimal Overhead for Mobile Devices", application Ser. No. 15/183,360, Filing Date: Jun. 15, 2016. [1] describes an invention with multiple secure virtualized environments operating one at a time with instant switching between environments and minimal resource use and power drain.
[1] is based on a special type of bare-metal hypervisor (type-1) with only one virtual machine in an active state and all other virtual machines frozen. While [1] is very efficient in terms of CPU and battery power usage, it has some usability limitations which are solved in the present invention.
[2] Rothman et al., "Switching A First OS In A Foreground To A Standby State In Response To A System Event And Resuming A Second OS From A Background", Pub. No.: U.S. Pat. No. 9,286,097 B2, Pub. Date: Mar. 15, 2016. [2] describes apparatuses, methods and storage media associated with switching operating systems.
[2] uses dynamic memory management with an OS context save/load during the switching process to/from a permanent storage. While the term "sleep" is widely used in [2], active usage of OS context save/load operations makes it closer to the hibernation-type of solutions well known in the art. Only a foreground virtual machine receives interrupts while a background virtual machine does not receive any.
[3] Reeves et al., "Cross-environment Event Notification", Pub. No.: US 2012/0084793 A1, Pub. Date: Apr. 5, 2012. [3] describes a mobile computing device with two operating systems running concurrently and independently on a shared kernel without virtualization. The first OS is a mobile operating system and the second OS is a desktop operating system. [3] supports cross-environment notifications.
[4] Newell et al., "Unified Notification Bar Between Virtual Mobile Device And Physical Mobile Device", Pub. No.: U.S. Pat. No. 9,448,825 B2, Pub. Date: Sep. 20, 2016. [4] describes the invention which displays alerts from the guest virtual machines in a host operating system on a mobile device. A hypervisor-aware service is used to forward notifications from a guest operating system to the host environment. [4] uses a type-2 (hosted) hypervisor.

DETAILED DESCRIPTION

Preferred embodiments of the present invention support generic VMs with different operating systems inside and is focused on providing an effective type-1 (bare-metal) virtualization solution for mobile devices with a high security level by creation of multiple isolated security environments, whereby there is only one foreground active operating system at a time and switching between operating systems occurs through user action. The architecture is optimized for use on mobile devices having limited computing and power resources.

In some other inventions, for example [4], a type-2 (hosted) hypervisor is used. In the present invention, a type-1 hypervisor is used and there is no host operating system. In contrast to the [4] and guest/host OS combination, preferred embodiments of the present invention support two classes of the VMs—(1) Foreground (always active) that has access to user hardware interfaces e.g. screen, audio and (2) Background (can be either active or inactive) that has access to communication and storage interfaces only.

As will be apparent to one having ordinary skill in the art, the present invention can be used to provide multiple secure and reliable security domains using virtualization on a mobile device. All VMs are fully isolated. There is no interface or any data exchange between VMs. VMs are hardware-isolated using virtualization and other security extensions of the computing system's CPU(s). To maximize security, tasks with different security requirements should be run in separate VMs.

Figure 1:
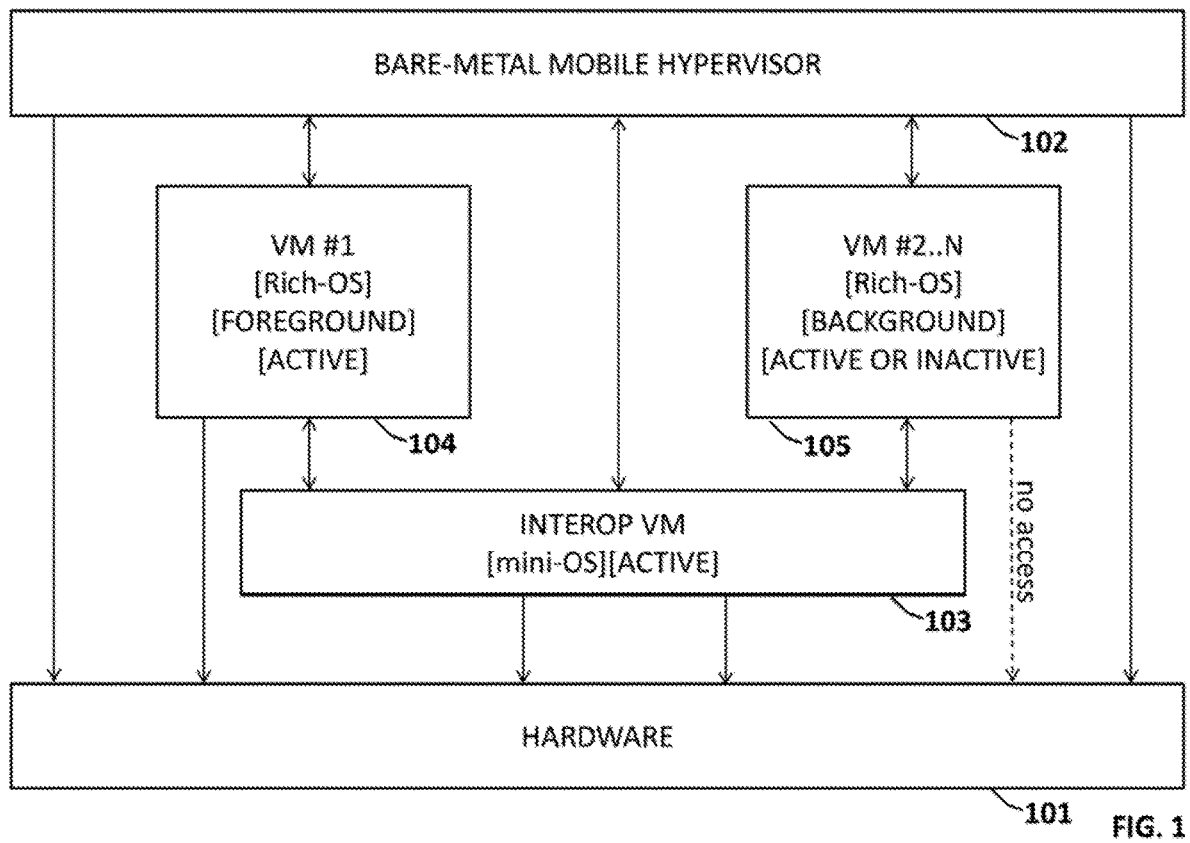
FIG. 1 depicts a general model of the present invention.

FIG. 1 depicts a general model of the present invention. Preferred embodiments of the present invention are based on the bare-metal mobile hypervisor (hypervisor) 102 which was also designed for use on mobile devices with limited processing power. The hypervisor performs all necessary functions to create a virtualization environment. For example, the hypervisor uses the timer interrupt for scheduling VMs, as well as generating events in running VMs for their own scheduling. Another example is binding VMs to virtual or physical interrupts required to work with hardware or virtual peripheral devices.

All Active VMs 103, 104, 105 work in parallel. The VMs 105 are in the inactive state and do not receive any CPU resources.

The Foreground VM 104 is active at all times during regular computing system operation. The Foreground VM has both direct access to the hardware 101 and access to the paravirtualized hardware via the Interoperability Virtual Machine (Interop VM) 103. Background VMs 105 do not have direct access to the hardware 101 but still can access paravirtualized hardware via the Interop VM 103.

Foreground and Background VMs run operating systems that provide a versatility of services to run user applications (Rich-OS) e.g. Android, iOS. On the other hand, the Interop VM runs a minimal operating system (mini-OS) that provides specific number of services only.

The main difference between a Foreground VM and Background VMs is that user interacts with a Foreground VM only. Background VMs do not have access to the user interface and interact with user only indirectly.

In some embodiments of present invention, Background VMs can have direct access to the specific hardware but only in the case where they work with this hardware exclusively. It will be apparent to one having ordinary skill in the art that in this case hardware does not need virtualization and can be accessed directly from the Background VM. For example, GPS module hardware can be assigned to one VM only and other VMs cannot receive GPS data. Also, this exclusive hardware access can be used in the Background VM to interact with the user. For example, a Background VM can have exclusive access to a LED indicator and use it to signal notifications to the user.

The present invention furthermore provides the option for the hypervisor to provide fully virtualized device interfaces that can be used by all VMs in parallel, but this approach generally does not offer good performance and optimal power consumption if device virtualization is not performed at the hardware level.

In some other inventions, for example [1], only one VM is active at a time. Preferred embodiments of the present invention support one Foreground VM and multiple Background VMs that are running in parallel or can be activated from time to time to check for new events and notify the active Foreground VM. Most of the time Background VMs in the present invention will remain in an inactive state reducing battery and system resources usage.

Interrupts are handled in the hypervisor or are redirected to the active VMs. This is a different architecture compared to prior art [2] where only a Foreground VM receives interrupts. Background VMs in [2] do not receive any interrupts. In the present invention, interrupts handling is not limited to the Foreground VM compared to [2].

All VMs managed by the hypervisor are isolated from each other by using hardware virtualization and security extensions, which significantly increase the overall security level of a mobile device. For example, in the ARM virtualization extensions for the Memory Management Unit (MMU), the hypervisor essentially sets the hardware to treat the "physical" addresses generated by the VM as virtual addresses and adds another level of translation on these addresses. The ARM terminology for the VM address is Intermediate Physical Address (IPA). The translation from IPA to PA is called a stage 2 translation and the translation from VA to IPA is called stage 1 translation. This virtualization extension allows creation of independent and hardware-isolated memory spaces for each VM.

The method provided in the present invention allows a Foreground VM and, in some cases, a Background VM to have direct access to peripheral hardware. This creates the possible attack vector where hardware can be used for unauthorized memory access from one VM to another. To address this issue in the present invention, all hardware that is used in a VM directly should be configured to use the Input/Output Memory Management Unit (IOMMU) by the hypervisor. This performs a similar feature to a MMU described above—namely, it maps between a physical and a virtual address space. The difference is the application, whereas an MMU performs this mapping for applications running on the CPU, the IOMMU performs it for devices. [Please note that IOMMU in ARM specifications is named as System Memory Management Unit (SMMU)]. SMMU also supports two-stage address translation and allows creation of independent and hardware-isolated memory spaces for the hardware, where hardware cannot access the memory outside of a defined boundary.

The method provided in the present invention prevents cross-contamination between VMs and allows continued use of clean VMs on a mobile device without additional security risks, even if one VM were compromised.

Figure 2:
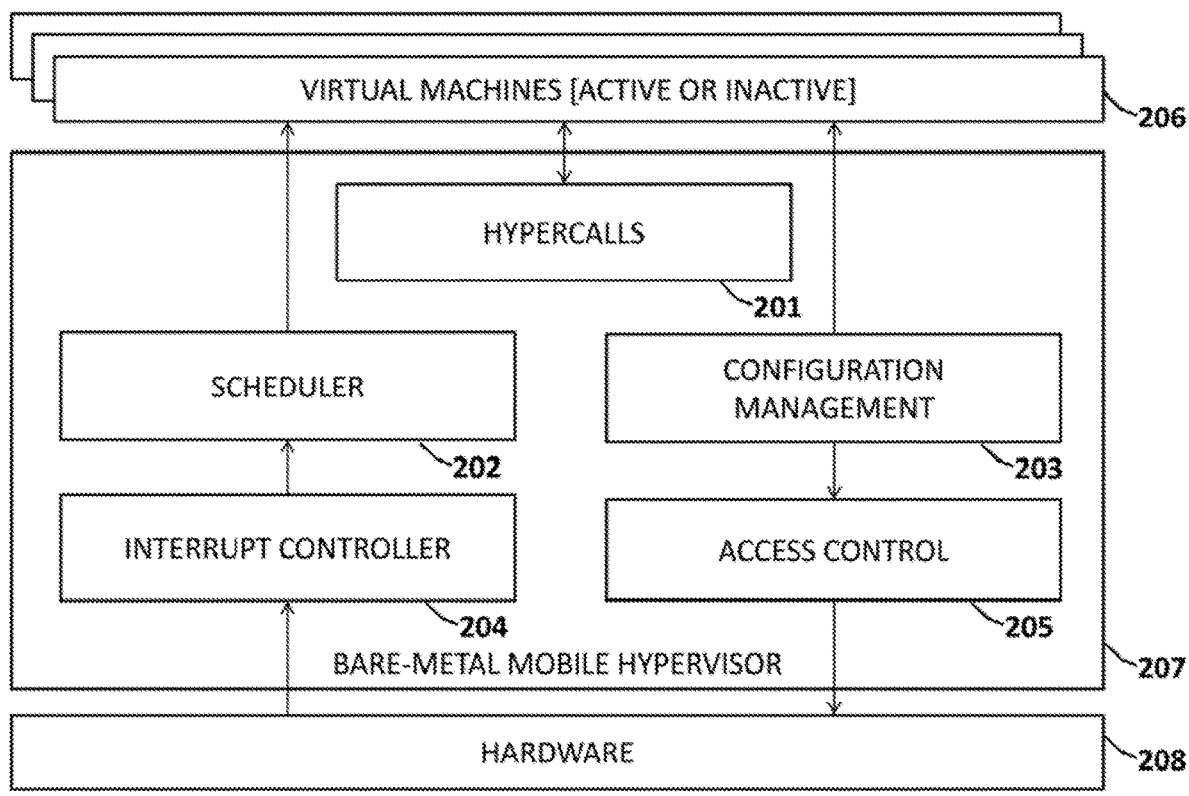
FIG. 2 presents an internal structure of bare-metal Mobile Hypervisor.

This is a different architecture compared to prior art [3] where two operating systems are running concurrently and independently on a shared kernel without virtualization. Preferred embodiments of the present invention use a specialized hypervisor and virtualization extension of the hardware platform. Each operating system running in a separate VM is completely isolated from other operating systems and does not share hardware or software resources, including kernel. FIG. 2 presents an internal structure of the bare-metal Mobile Hypervisor (hypervisor) 207. The hypervisor is a central part of the present virtualization solution. Its primary task is to provide hardware-isolated environments between VMs and distribute computing and system resources among them.

A Programmable Interrupt controller 204 is responsible for combining several sources of interrupt onto one or more CPU lines, and allowing priority levels to be assigned to interrupt outputs. Hardware devices 208 issue interrupt requests to signal regarding the events that should be processed by the computing system. The classical example of interrupts is a timer interrupt that is used by a Scheduler 202 to quantify the CPU usage in the system.

A Scheduler is responsible for distributing computing resources (or in other words managing CPU's usage) among the VMs 206;

VMs use Hypercalls interface 201 to communicate with the hypervisor.

Configuration Management 203 is responsible for allocating, configuring and managing system resources between VMs.

An Access Control module 205 is responsible for security policies enforcement, using hardware assistance to maintain isolation between the VMs. It controls access to the hardware resources including memory, permanent storage and peripheral devices. In some embodiments of the present invention access control functions can be performed by the hypervisor in combination with an Interop VM.

The main difference between the present hypervisor and a typical hypervisor (illustrated in FIG. 10) is that in the preferred embodiments of the present invention, Background VMs are working without access to the user interface, most of the time spending in the inactive state and activating from time to time to process the incoming events. Also, the Foreground VM uses exclusive direct access to the most part of the hardware without additional layer of virtualization. This approach creates minimal overhead for the computing resource and power consumptions and simultaneously provides desired notifications delivery for all VMs.

Figure 3:
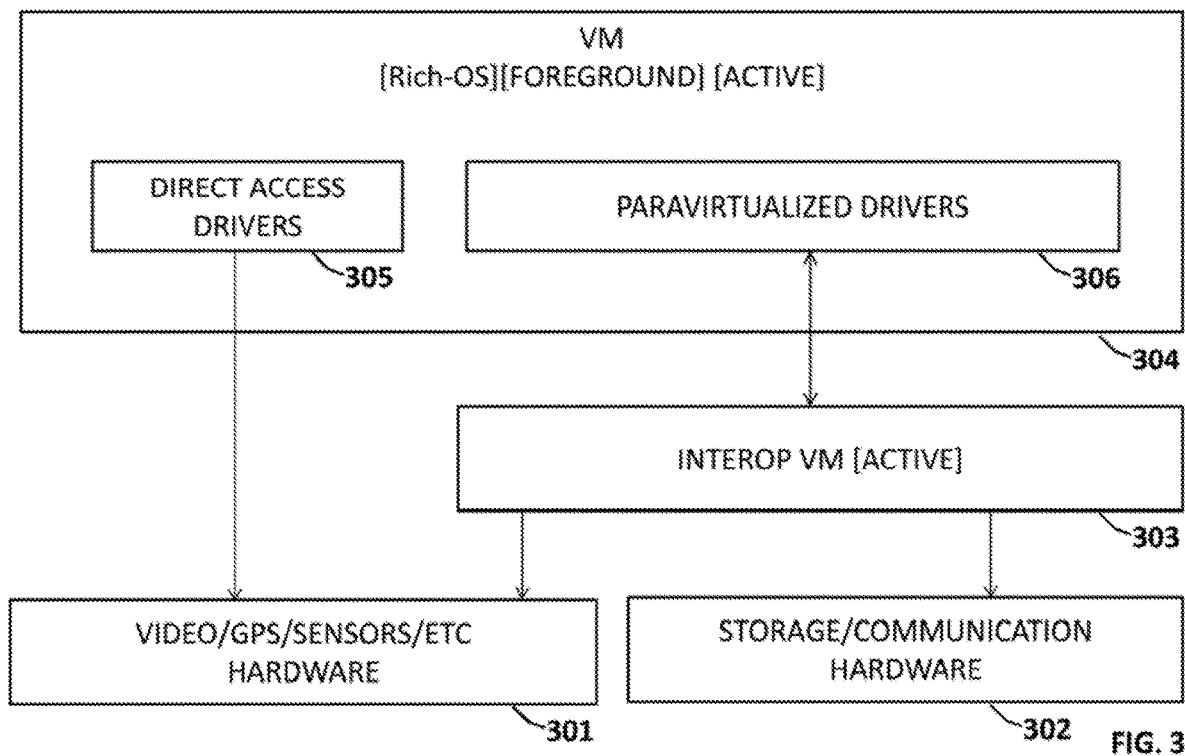
FIG. 3 illustrates a Foreground VM driver model.

FIG. 3 illustrates a Foreground VM driver model.

Foreground VM 304 uses both direct and paravirtualized hardware.

All storage and communication hardware 302 are available through the paravirtualized drivers 306 using the Interop VM 303.

Other types of hardware 301, including but not limited to video/GPS/sensors/etc., are managed by the direct hardware access drivers 305.

Access control for all available hardware devices is managed by the access control module 205 inside the hypervisor 201 as shown in FIG. 2.

Figure 6:
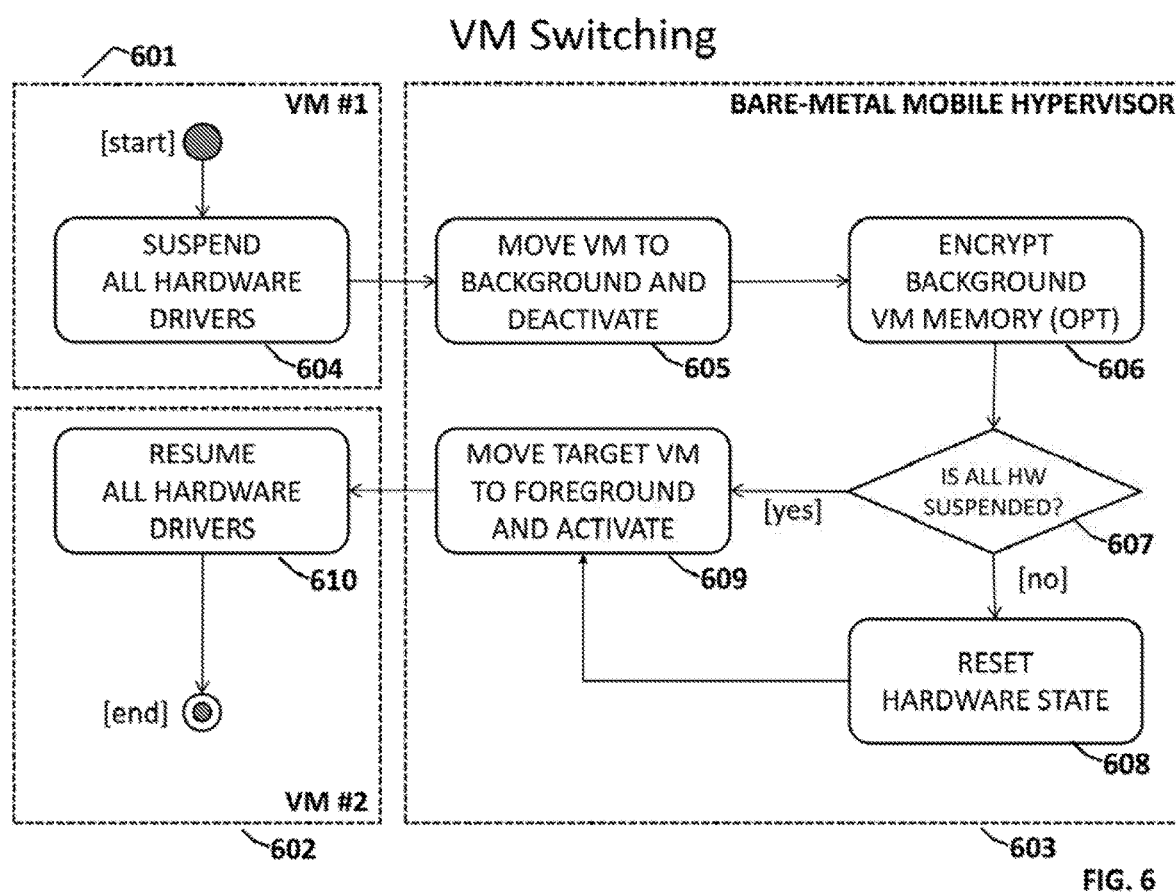
FIG. 6 depicts the VMs' switching process.

The Foreground VM can be switched with one of the Background VMs as is depicted in FIG. 6.

Figure 4:
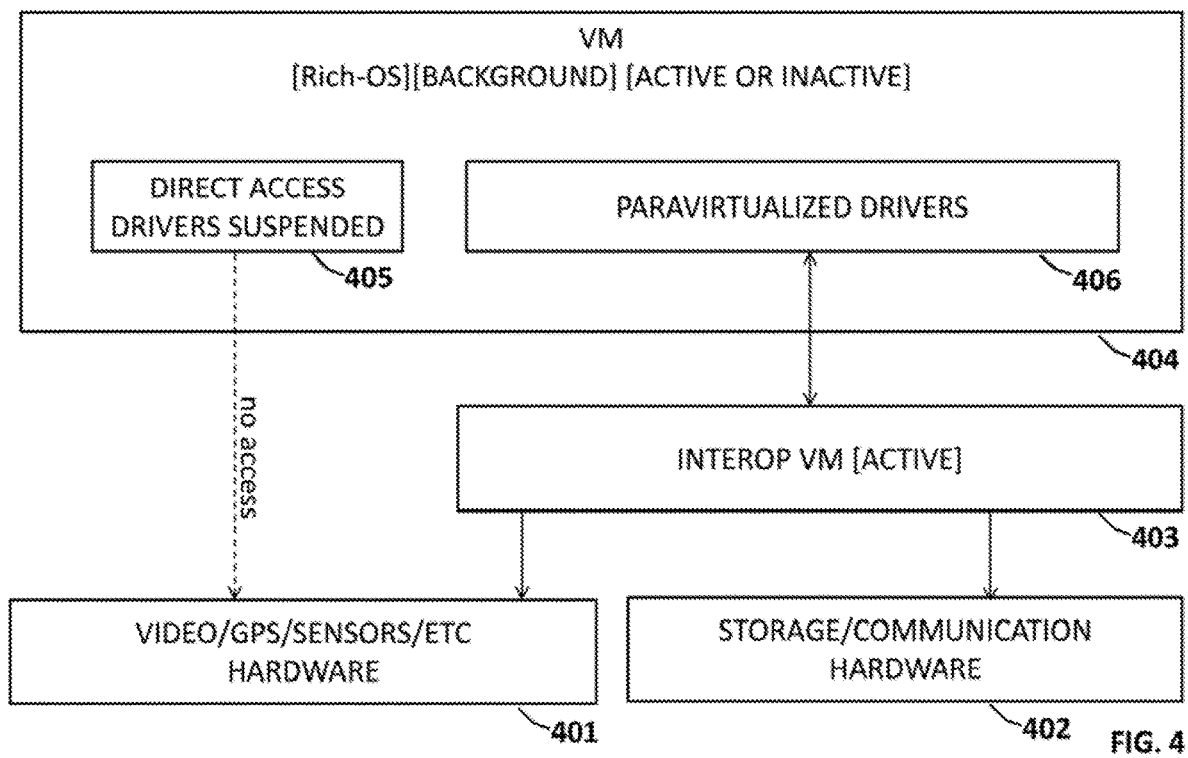
FIG. 4 depicts a Background VM driver model.

FIG. 4 depicts a Background VM driver model.

Background VM 404 has an access to the paravirtualized hardware 402 only. Storage and communication hardware 402 are available for paravirtualized drivers 406 through the Interop VM 403.

Direct access drivers 405 are suspended for all Background VMs and have no direct access to hardware 401.

Access control for all available hardware devices is managed by the access control module 205 inside the hypervisor 201 as shown in FIG. 2.

Figure 9:
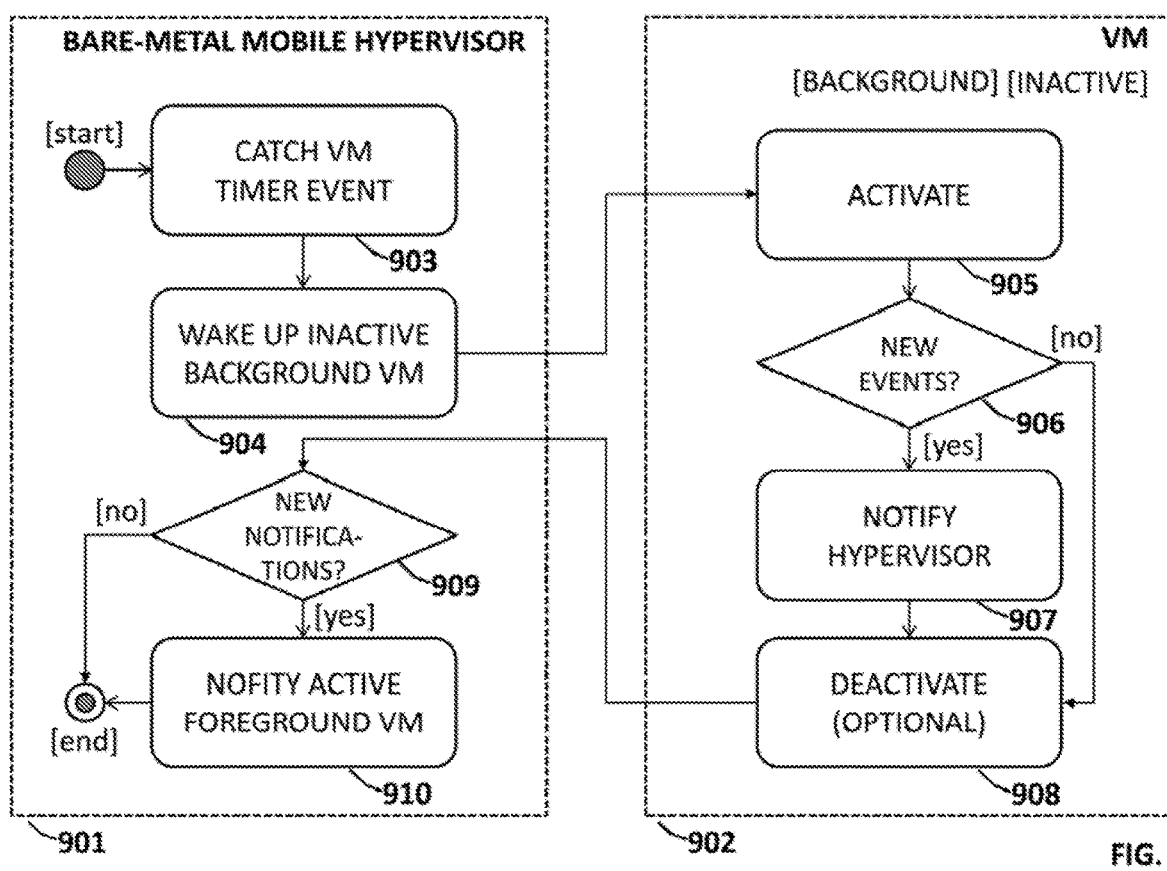
FIG. 9 illustrates event detection and notification process.

Background VMs are working without access to the user interface, most of the time spent in the inactive state and activating from time to time to process incoming events as is described in FIG. 9.

It will be apparent to one having ordinary skill in the art that the majority of the current mobile applications and services are designed to be able to work in the background mode where they communicate with the user only through the OS notification services. Therefore, running mobile applications and services in the background mode does not require any modifications in the applications code. Thus the Background VM needs merely to switch all the applications into the background mode.

Figure 5:
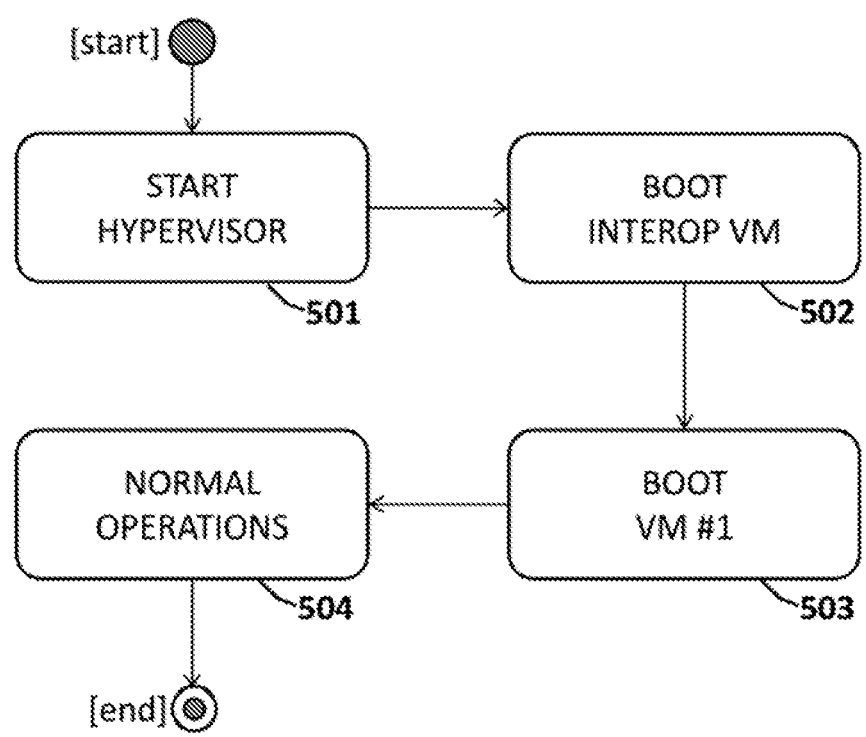
FIG. 5 illustrates the loading process of a VMs.

FIG. 5 illustrates the loading process of VMs.

First, the hypervisor is started 501. Next, the Interop VM 502 is booted. Then, VM #1 is loaded 503 as a Foreground VM and the Rich-OS starts normal operations 504. If more VMs exist, the hypervisor can start them as Background VMs immediately or during the first switch process.

In the preferred embodiments of the present invention all critical modules of the hypervisor are protected with digital signatures, included in the device bootloader's chain-of-trust Secure Boot process. Optionally, full or partial digital signature verification can be performed on VMs before loading. Some non-volatile storage data partitions can be configured as read-only, providing an additional protection for the critical internal parts such as the bootloader, kernels, drivers, operating system modules and services.

The number of loaded VMs is limited by the available device memory. Other VMs can be loaded later manually by a user or automatically by the hypervisor of the present invention. If a VM is no longer needed it can be removed from the memory.

After successful completion of the boot process, the hypervisor and VMs start operating normally 504.

FIG. 6 illustrates the VM switching process.

First, the first VM 601 suspends 604 all drivers that have a direct access to the hardware. All pending operations with the hardware should be completed before the next step. It prevents possible data leakage from this VM.

Virtual/paravirtualized hardware used by the active virtual machine is not affected by the switching process.

At the next step 605, the hypervisor 603 moves the VM 601 into background mode and changes the access control policy rules to prevent any direct access from this VM to the hardware. All running applications and services are switched into background mode and left as is, without change. This step does not include any VM state to be written to a non-volatile storage, in contrast to the hibernate-like processes well known in the prior art, for example in [2]. All VMs are available in the memory at all times.

Using the approach described above, all switching between VMs in the present invention is performed quickly and does not involve any VM state save/load operations.

The only difference between Foreground and Background VMs are direct access to the hardware and CPU time allocation, however, the inactive Background VM does not consume CPU resources or power.

In addition, optionally, the hypervisor 603 can encrypt VM memory 606 or its parts. Depending on the amount of memory dedicated to the VM, full memory encryption can, however, be an undesirable time-consuming operation.

Next, the hypervisor 603 checks to assure that all required hardware drivers are suspended, clears the hardware state, moves the target VM 609 to foreground, changes the access control policy rules to allow direct access from this VM to the hardware and activates it. Otherwise, the hardware state will first perform a reset 608. The activation does not include loading a VM state from a permanent storage and therefore is completed instantly.

Each VM has its own private hardware state. To prevent data exchange between VMs, which therefore might cause cross-contamination from an infected machine to a clean machine, critically, the hypervisor does not activate the next VM before the required direct access hardware drivers are correctly suspended first, then followed by hardware state clearance. This approach reduces the attack surface of a computing system that would otherwise be present in current hypervisor technology.

Now the second VM 602 is ready to work with hardware. As a final step of the VM switching process, the second VM 602 resumes all hardware drivers 610 and starts operating normally.

As is apparent to one having ordinary skill in the art, the process described above is completely different from the sleep/resume, hibernate/restore or hypervisor instant switch processes known in the prior art and is well suited for mobile devices to conserve processing power while providing hardware-enforced isolation of VMs to prevent potential cross-contamination, especially from malware exploits able to gain escalated privileges.

Figure 7:
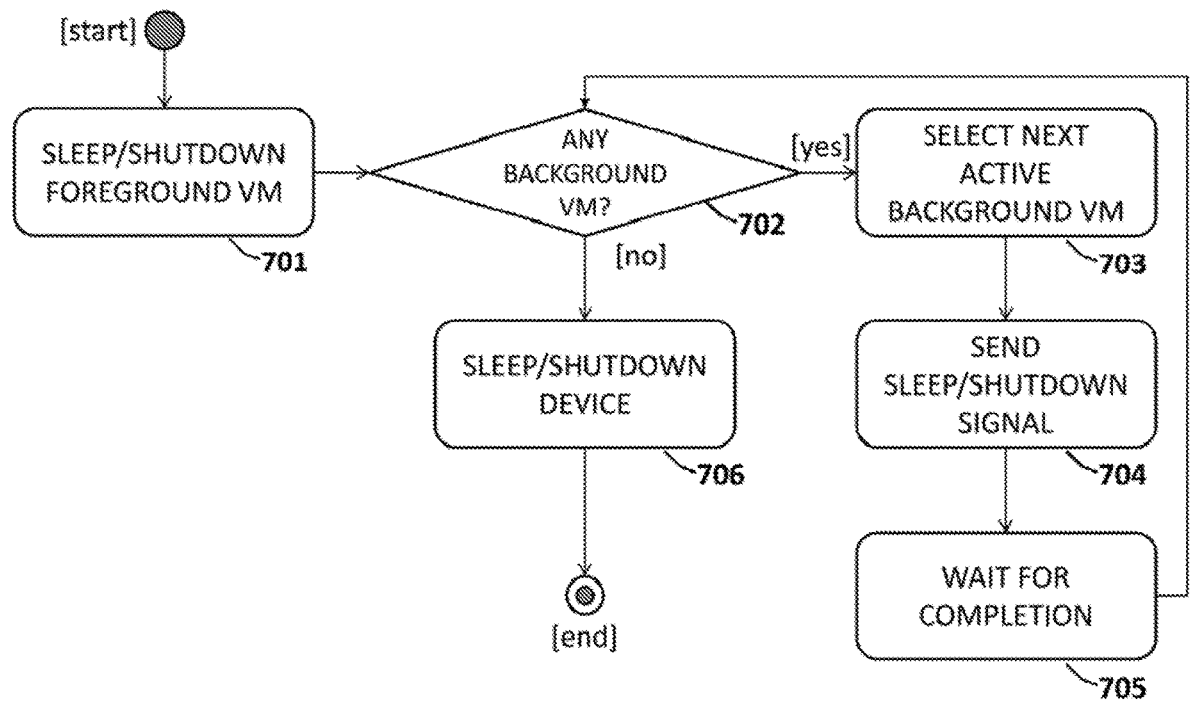
FIG. 7 illustrates the VM sleep/shutdown process.

FIG. 7 illustrates the computing system sleep/shutdown process. First, a normal sleep/shutdown process inside the Foreground VM 701 is started. As soon as this process is completed, the hypervisor 102 shown in FIG. 1 starts processing VMs in the active background state. Each active Background VM is selected first 703, then a normal sleep/shutdown process 704 is started. This sequence is important because an active Background VM can have unfinished operations. This increases the overall reliability of the system and reduces the risk of losing data.

After successful sleep/shutdown of all VMs, the device is switched to sleep mode or switched off 706. Optionally, all Background inactive VMs can be activated and proceed through the normal sleep/shutdown process too.

Figure 8:
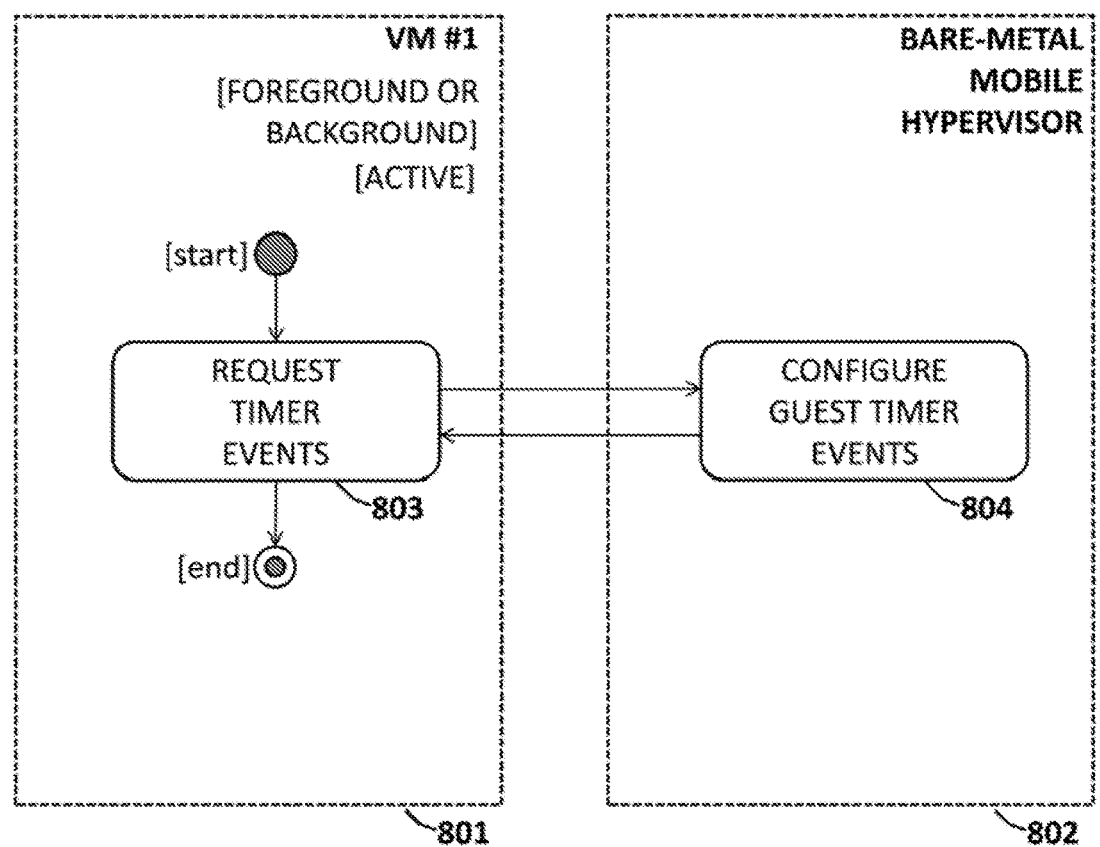
FIG. 8 depicts a guest timer configuration process.

FIG. 8 depicts a guest timer configuration process.

An active Foreground or Background VM 801 requests 803 an update to its guest timer events 804 in the hypervisor 802.

The hypervisor updates configuration data and returns result code of the operation 804 to VM 801.

FIG. 9 illustrates the events detection and notifications process.

The hypervisor 901 catches VM Timer Event 903 for the inactive Background VM 902 and wakes up 904 the VM. VM switches from inactive state into active state. The VM activates 905 and its applications and services check for new events 906.

In case a new event is detected, the VM notifies 907 the hypervisor and optionally goes to the inactive state (i.e., deactivates itself) 908. If no new events are detected, the VM skips the notification step and goes directly to the optional deactivation.

If the hypervisor receives 909 any notifications from the VM, it sends notification 910 to the Foreground VM.

Figure 10:
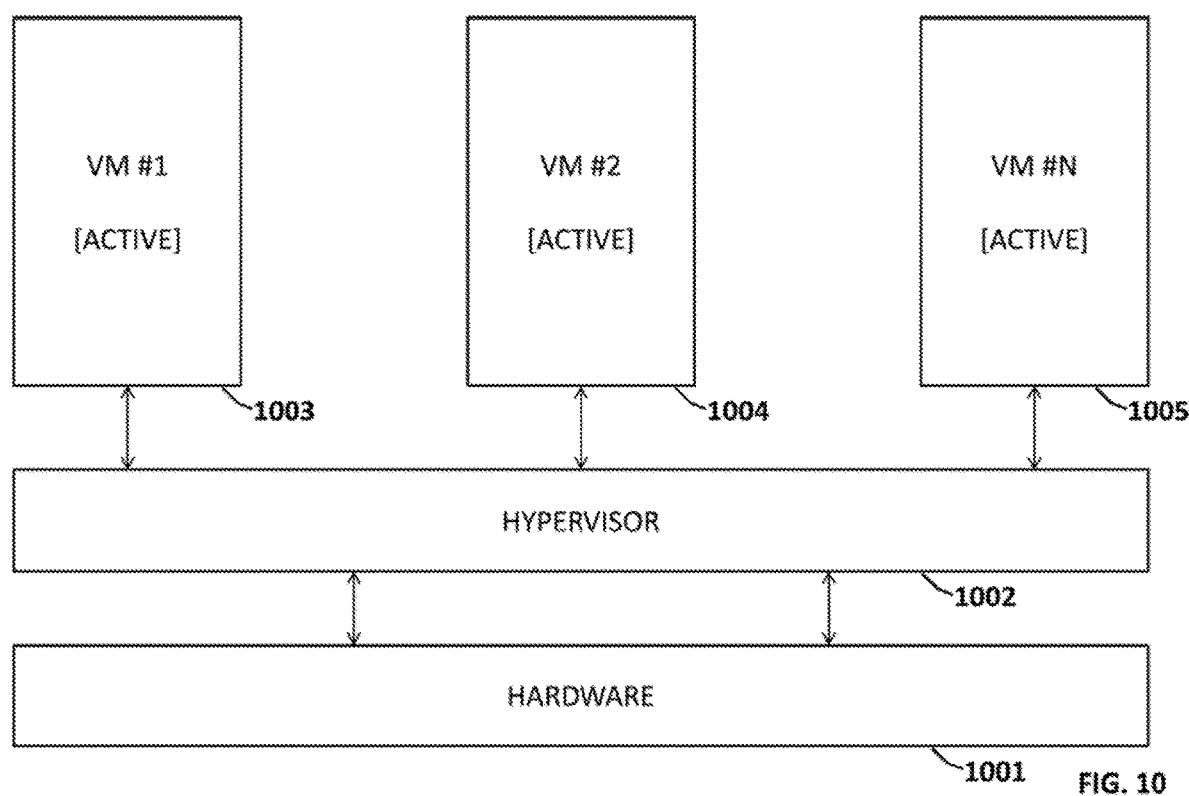
FIG. 10 depicts a typical bare-metal hypervisor-based solution well known in the prior art.

FIG. 10 illustrates a typical bare-metal hypervisor-based solution well known in the prior art. A type-1 (bare metal) hypervisor 1002 is running directly on the device hardware 1001 and manages one or more VMs 1003-1005.

These VMs are always active and thus continuously consume computing resources. While VMs can be deactivated (suspended) in this approach, only a device administrator or external software can activate a suspended VM.

VMs 1003-1005 use emulated virtual hardware which result in undesirably high consumption of the available system resources. While this approach may not have any significant resource limitations on today's servers or other powerful hardware, it does for mobile devices running several operating systems in parallel, creating performance issues due to CPU resource and power consumption. These issues are exacerbated when also using peripheral hardware driver virtualization, such as for graphics, hardware video acceleration, cellular modem support, and others.

I claim:

1. A computing system with multiple hardware-isolated virtual machines (VMs) with a minimal overhead requirement comprising:
    a physical computing system comprising a Central Processing Unit (CPU), virtualization extensions, a memory, a memory management unit (MMU), an input/output memory management unit (IOMMU), a user interface hardware and a storage/communication hardware;
    a foreground VM comprising a foreground direct driver to access the user interface hardware and a foreground paravirtualized driver to access the storage/communication hardware;
    a background VM comprising a background direct access driver to access the user interface hardware and a background paravirtualized driver to access the storage/communication hardware;
    an interoperability VM comprising a direct access driver to access the storage/communication hardware, wherein the interoperability VM allows paravirtualized access to the storage/communication hardware from the background VM and the foreground VM; and
    a bare-metal hypervisor to concurrently run, independently and isolated from one another, each of the interoperability VM, the foreground VM, and the background VM,
    wherein the bare-metal hypervisor performs a switch from the foreground VM to the background VM upon a switch initiation, wherein during the switch the foreground VM becomes the background VM and vice-versa,
    wherein the bare-metal hypervisor configures the input/output memory management unit to prevent direct access to the user interface hardware by the background VM,
    wherein the bare-metal hypervisor configures the input/output memory management unit to only allow a direct access to the storage/communication hardware by the interoperability VM,
    wherein an interrupt for the user interface hardware is handled by the foreground VM and an interrupt for the storage/communication hardware is handled by the interoperability VM,
    wherein the bare-metal hypervisor activates the background VM from time to time without performing the switch between the foreground VM and the background VM, and
    wherein the bare-metal hypervisor activates the background VM and allocates CPU resources thereto when the background VM is a target of the custom timer event or of a paravirtualized storage and communication driver interrupt event.

2. The computing system as claimed in claim 1 wherein the background VM and the foreground VM each run a generic operating system.

3. The computing system as claimed in claim 1 wherein the user interface hardware comprises one or more of a display, a Global Positioning System (GPS) receiver, a hardware video accelerator, a cellular modem support, or a sensor.

4. The computing system as claimed in claim 1 wherein the bare-metal hypervisor distributes CPU resources unequally among the interoperability VM, the foreground VM and the background VM, and the bare-metal hypervisor conserves CPU resources by deactivating the background VM most of the time.

5. The computing system as claimed in claim 1 wherein the background VM notifies the bare-metal hypervisor to notify the foreground VM when a system event requiring a users input is detected.

6. The computing system as claimed in claim 1 wherein during the switch the hare-metal hypervisor sends a "switch to sleep mode" event to the foreground VM and allows the foreground VM to handle the switch, and a pending direct operation with the user interface hardware or the storage/communication hardware is completed in the foreground VM before switching between the foreground VM and the background VM.

7. The computing system as claimed in claim 1 wherein the hare-metal hypervisor, during a computing system shutdown, initiates shutdown of the computing system after shutting down the foreground VM, the background VM and the interoperability VM.

8. The computing system as claimed in claim 1 wherein the background VM accesses a hardware in direct mode when the access to the hardware is exclusive of the foreground VM and the interoperability VM.

9. The computing system as claimed in claim 1 wherein the interoperability VM filters, restricts access to or encrypts communication between an external network and the foreground VM or the background VM.

10. The computing system as claimed in claim 1 wherein the bare-metal hypervisor fully or partially, encrypts a VM memory of the background VM.

11. The computing system as claimed in claim 1 wherein a computing system bootloader loads the bare-metal hypervisor when the bare-metal hypervisor is successfully validated.

12. The computing system as claimed in claim 1 wherein the bare-metal hypervisor periodically performs integrity validation of the background VM or the foreground VM.

13. The computing system as claimed in claim 1 wherein the switch between the foreground VM and the background VM is initiated by a specific system event.

14. The computing system as claimed in claim 1 wherein the switch between the foreground VM and the background VM is forbidden.

15. The computing system as claimed in claim 1 wherein a limited and controlled communication between the foreground VM and the background VM is allowed.

16. The computing system as claimed in claim 1 wherein the computing system comprises one or more of a mobile device, an Internet of Things (IoT) device, a communication device or a wearable device.

* * * * *